United States Patent [19]
Boehme

[11] Patent Number: 5,222,773
[45] Date of Patent: Jun. 29, 1993

[54] EASY-OFF SEAL ASSEMBLY

[76] Inventor: Hilary C. Boehme, Atlantic Ultraviolet, 250 N. Fehr Way, Bay Shore, N.Y. 11706

[21] Appl. No.: 845,326

[22] Filed: Mar. 3, 1992

[51] Int. Cl.$^5$ .............................................. F16L 17/02
[52] U.S. Cl. ..................... 285/344; 285/93; 285/901; 138/89
[58] Field of Search ................ 285/344, 93, 901; 138/89

[56] References Cited

U.S. PATENT DOCUMENTS

| | | | |
|---|---|---|---|
| 2,063,967 | 12/1936 | Whittam | 285/344 X |
| 2,094,629 | 10/1937 | Whittam | 285/344 X |
| 2,674,472 | 4/1954 | Meyer | 285/344 X |

FOREIGN PATENT DOCUMENTS

| | | | |
|---|---|---|---|
| 21881 | 1/1930 | Australia | 285/344 |
| 858164 | 12/1952 | Fed. Rep. of Germany | 285/344 |
| 895998 | 11/1953 | Fed. Rep. of Germany | 285/344 |
| 458958 | 12/1936 | United Kingdom | 285/344 |

Primary Examiner—Dave W. Arola
Attorney, Agent, or Firm—Richard L. Miller

[57] ABSTRACT

A closure assembly having an O-ring seal which produces extremely low break-out friction is provided. This is achieved by utilizing an annular endless groove which is wider than the material diameter of the O-ring in a first fitting and a flared distal end in a mating second fitting, which permits the O-ring to simultaneously compress and roll, thereby allowing for a much tighter seal than conventional O-rings' seal with out easily rupturing the O-ring.

2 Claims, 1 Drawing Sheet

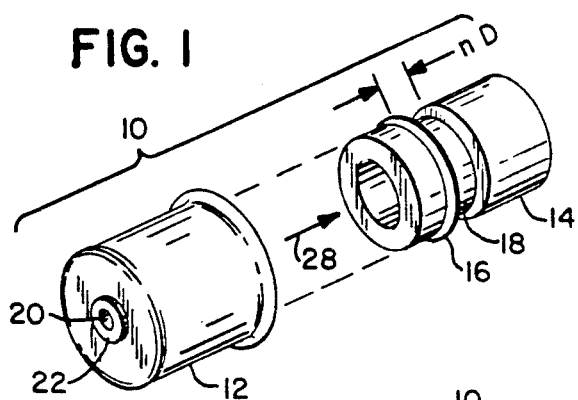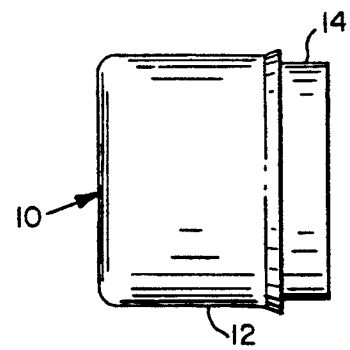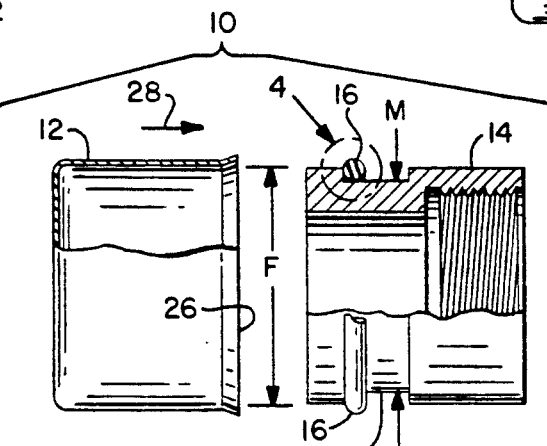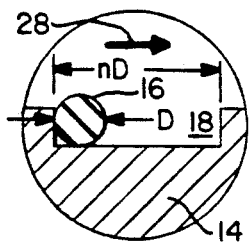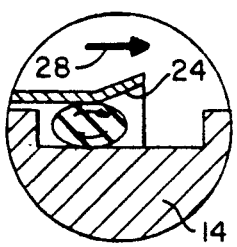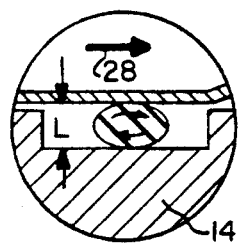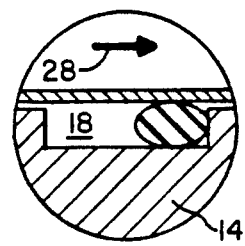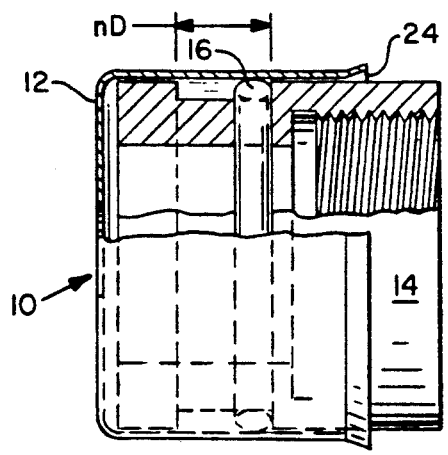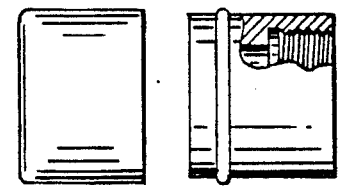

EASY-OFF SEAL ASSEMBLY

BACKGROUND OF THE INVENTION

The instant invention relates generally to easy-off seal assembly, and more particularly to an easily accessible sealing mechanism for plumbing connections between fluid transfer fittings or inspection ports for observing and examining various gauges, indicators or physical conditions in a variety of machines and systems.

Numerous easy-off seal assemblies have been provided in the prior art that are adapted to be easily opened and closed with little effort on the part of the technician. While these units generally may be suitable for the particular purpose to which they address, they would not be as suitable for the purpose of the present invention as hereafter described.

SUMMARY OF THE INVENTION

A primary object of the present invention is to provide an easy-off seal assembly that will overcome the shortcomings of the prior art devices.

Another object is to provide an easy-off seal assembly which provides an effective seal while simultaneously permitting a technician to immediately open the seal with one hand and without the use of any tools.

An additional object is to provide an easy-off seal assembly which secures the moving components in a seated position until intentional force is applied.

A further object is to provide an easy-off seal assembly which eliminates the seizing problems caused by break-out friction commonly associated with O-rings while simultaneously allowing for machine tolerances to be considerably less critical than they are for prior art devices.

A yet further object is to provide an easy-off seal assembly that is still simple and easy to use.

A still further object is to provide an easy-off seal assembly which that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that may be made in the specific construction illustrated and described within the scope of the appended claims.

BRIEF DESCRIPTION OF THE DRAWING FIGURES

The figures in the drawings are briefly described as follows:

FIG. 1 is a perspective view, with the cover removed, of a typical embodiment of the instant invention per se;

FIG. 2 is a side elevational view with the cover installed;

FIG. 3 is a side elevational view with the cover removed and parts broken away;

FIG. 4a is a greatly enlarged diagrammatic view taken in the area indicated by arrow 4 in FIG. 3, illustrating the initial position of the O-ring before the cover is installed on the corresponding mating fitting;

FIG. 4b is a greatly enlarged diagrammatic view taken in the area indicated by arrow 4 in FIG. 3, illustrating the position of the O-ring just after the cover is partially engaged with the corresponding mating fitting;

FIG. 4c is a greatly enlarged diagrammatic view taken in the area indicated by arrow 4 in FIG. 3, illustrating the position of the O-ring when the cover is nearly fully installed on the corresponding mating fitting;

FIG. 4d is a greatly enlarged diagrammatic view taken in the area indicated by arrow 4 in FIG. 3, illustrating the position of the O-ring when the cover is fully installed on the corresponding mating fitting;

FIG. 5 is an enlarged diagrammatic cross sectional view of the instant invention illustrating the cover in a fully closed position; and FIG. 6 is a reduced side elevational view, with the cover removed, illustrating a typical prior art embodiment of a similar closure seal device.

DETAILED DESCRIPTION OF THE PREFERRED EMBODIMENTS

Turning now descriptively to the drawings, in which like reference characters denote like elements throughout the several views, FIGS. 1 and 3 best show an easy-off seal assembly 10, with a first fitting, typically an inspection female cover 12, removed from a corresponding second mating fitting, typically a male fitting 14. An O-ring 16 is located in a an annular endless groove 18 around the outer periphery of the corresponding mating male fitting 14. The female cover 12 in this case as shown only in FIG. 1 may have an inspection sight 20 and/or grommet 22 to permit information, signals, fluids, etcetera to be transmitted therethrough as may be required by the design parameters of the particular machine or system in which the instant invention is incorporated.

The groove 18 is formed by a smooth basel surface extending, uninterrupted, completely between opposed sidewalls which upstand perpendicularly from the basal surface and define between them a groove width nD where n is any convenient number larger than 1, as may be required by the parameters of a particular design and D is the material diameter of the O-ring 16 installed therein. The radial length L which is one half the difference between the female member's inside diameter F and the groove's outside diameter M has to be somewhat less than the material diameter D of the O-ring 16, so that when the female cover 12 is forced onto the corresponding mating male fitting 14, the O-ring's material diameter is compressed from D to L while simultaneously caused to roll from an initial position (shown in FIG. 4a), through intermediate positions (shown in FIGS. 4b and 4c respectively) to a final position (shown in FIG. 4d).

That is: $L=(F-M)/2$, $D>L$ and $n>1$, where D is the undistorted material diameter of the O-ring.

In order to facilitate the distortion of the material diameter of the O-ring 16 from D to L an outwardly flared portion 24 is formed at the distal, entry end 26 of the female cover 12.

An additional benefit achievable by the instance invention design is realized because when the O-ring 16 is permitted to roll during the installation and removal of the female cover 12 on the mating male fitting 14, the final value for L can be designed significantly smaller than it might otherwise be in a conventional prior art device (illustrated in FIG. 6) where only a sliding closure action is permitted. As a result, a much tighter seal may be had without easily damaging the O-ring as is otherwise the case with prior art devices, when the cover is forced in the direction of arrow 28 or 28' onto the corresponding mating male fitting.

It is also to be pointed out that break-out friction, a characteristic that is notoriously associated with O-rings seizing to surfaces to which they are in intimate contact with, is virtually eliminated because the O-ring is permitted to roll rather than slide during removal or installation of a device cover when the instant invention has been incorporated therein.

The instant invention can be designed so that the value of n can be chosen in many ways and is not particularly as long as n is somewhat larger than one. A rather convenient value which permits the O-ring to make one full revolution when the cover is installed is when n is chosen to be: $nD = D + \pi D = (1 + \pi)D$, or $n = 4.14$.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An easy-off seal assembly which comprises:

a) an inspection female cover having an entry end;
   b) a corresponding mating male fitting having a longitudinal axis;
   c) a sealing O-ring in intimate contact therewith, for preventing the entrance or egress of matter respectively from entering or leaving said easy-off seal assembly when said inspection female cover is installed on said corresponding mating male fitting; and
   d) means for permitting said O-ring to both simultaneously roll and compress during mating movement of said cover and said male fitting which is respectively an annular endless groove located around the periphery of said corresponding mating male fitting, formed by a smooth basal surface parallel to said axis and extending, uninterrupted, completely between opposed sidewalls which upstand perpendicularly from the basal surface the same distance from said longitudinal axis and defined between them a groove width larger than a material diameter of said O-ring and an outwardly flared portion formed at the entry end of said inspection female cover.

2. An easy-off seal assembly according to claim 1 in which the groove width is nD where D is the material diameter of the undistorted O-ring and n is $1 + \pi$.

* * * * *